United States Patent Office

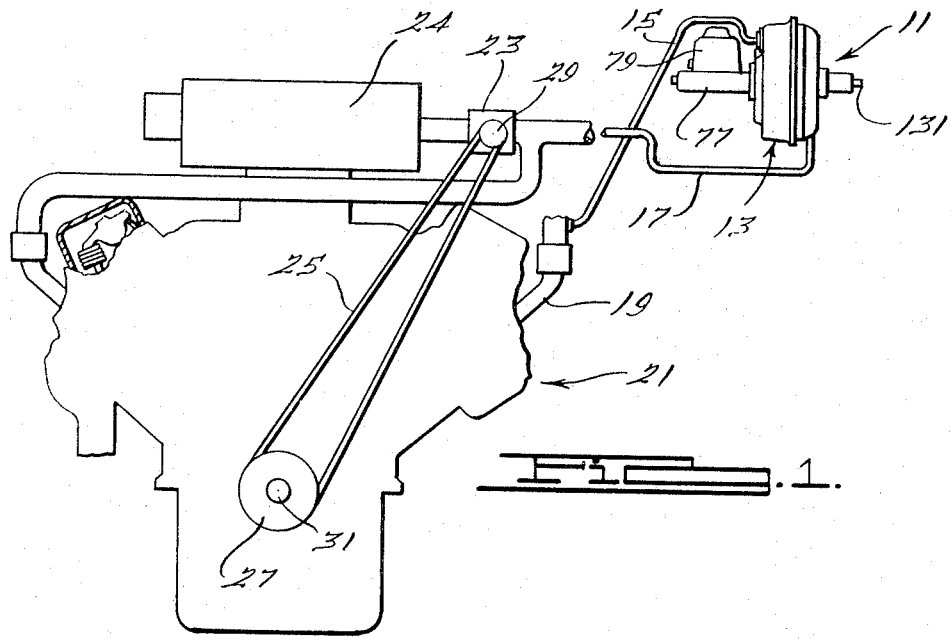
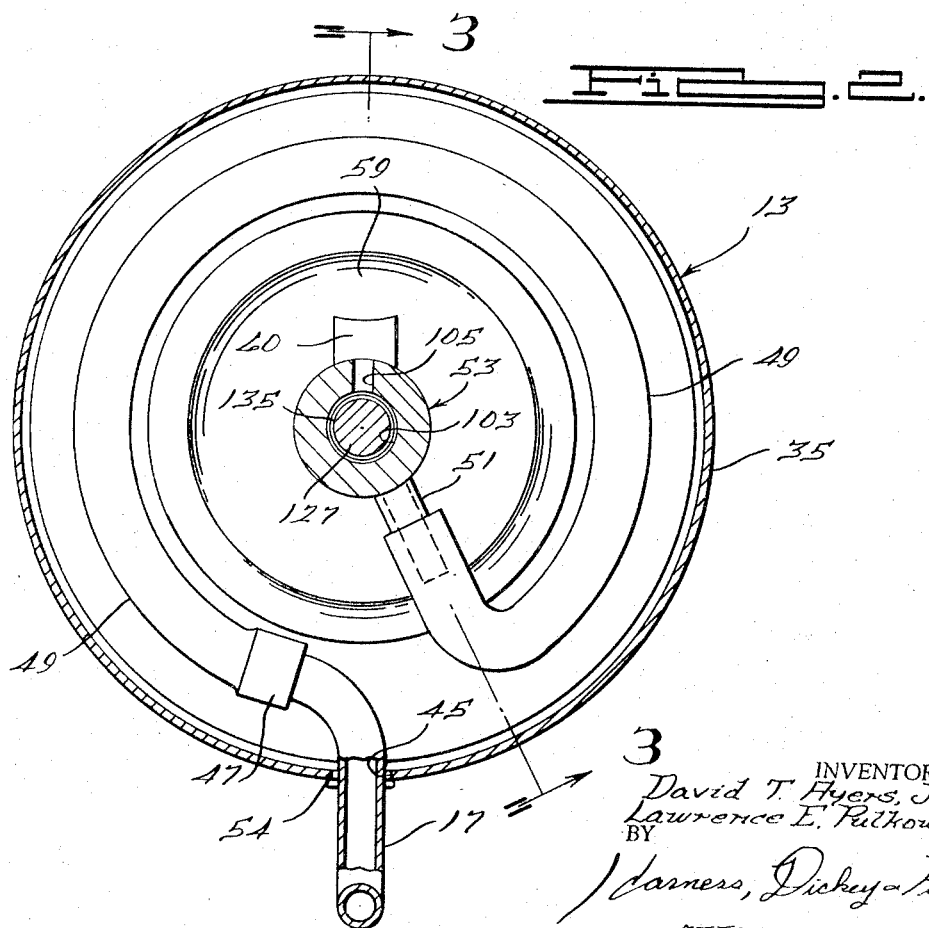

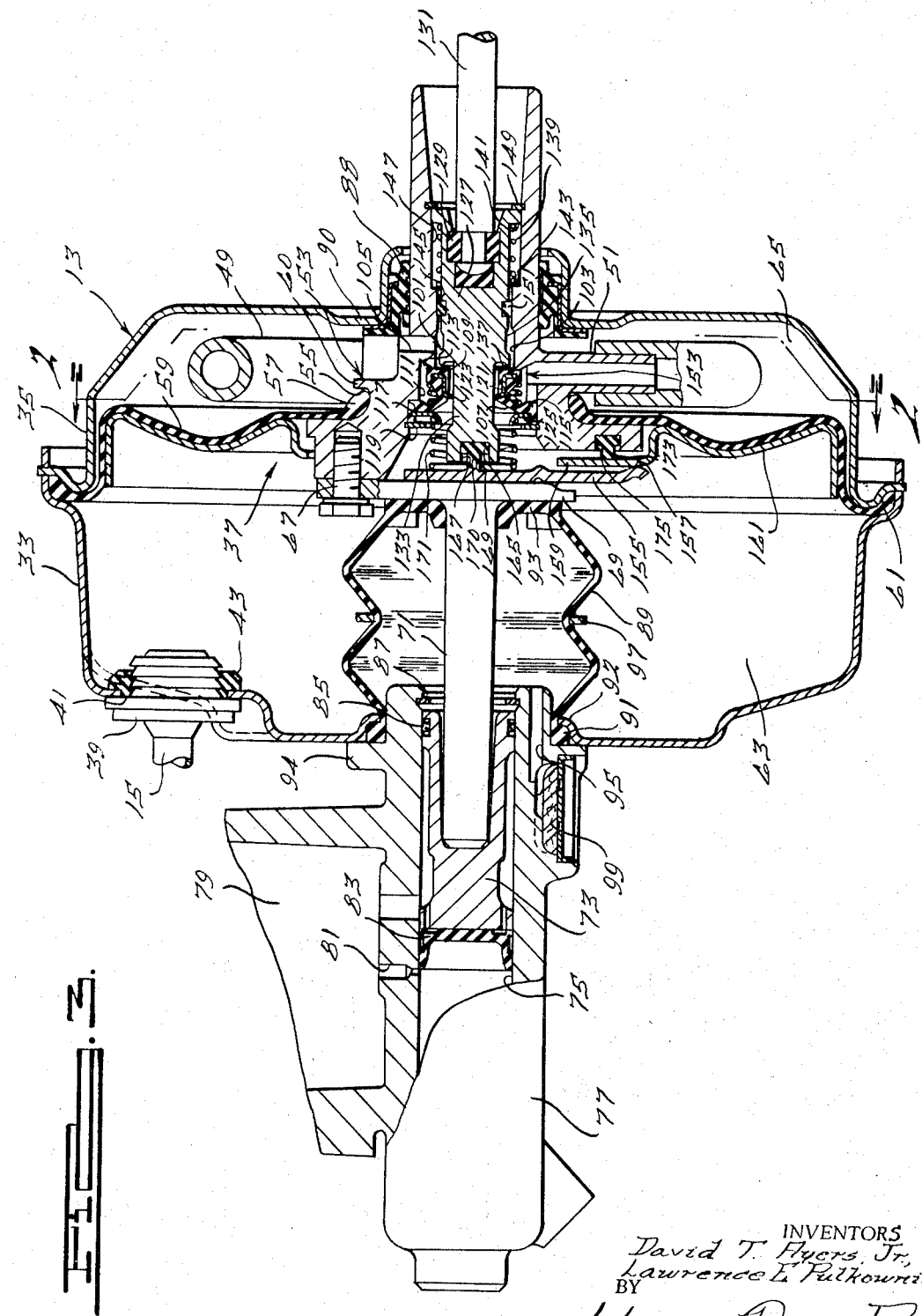

3,369,364
Patented Feb. 20, 1968

3,369,364
VEHICLE POWER BRAKE MECHANISM
David T. Ayers, Jr., Birmingham, and Lawrence E. Pulkownik, Plymouth, Mich., assignors to Kelsey-Hayes Company, Romulus, Mich., a corporation of Delaware
Filed Feb. 9, 1966, Ser. No. 526,153
7 Claims. (Cl. 60—54.5)

ABSTRACT OF THE DISCLOSURE

A power braking system for a motor vehicle driven by an internal combustion engine. The braking system includes a booster unit that is actuated in part by the air pressure generated by an air compressor that is driven by an internal combustion engine and which air compressor is used in conjunction with a smog emission reducing system of the engine.

---

This invention relates generally to vehicle power brake assemblies, and particularly to an improved, highly efficient and compact power brake booster unit.

In general, power brake booster units employ a differential pressure responsive movable wall operatively connected to the vehicle master cylinder. The pressure responsive wall is brought into play by application of a conventional brake pedal and applies a greater force to the piston of the master cylinder than the manual force applied to the brake pedal by the vehicle operator. The resulting pressure developed in the master cylinder, in turn, pressurizes the brake cylinders at the vehicle wheels to slow or stop the vehicle.

Conventionally, the differential pressure wall includes a diaphragm which is exposed on one side thereof to atmospheric pressure and on the other side to either subatmospheric or superatmospheric pressure. In the former, atmospheric pressure acting on one side of the diaphragm moves it in a direction against the subatmospheric pressure or vacuum condition on the other side usually supplied by exposing this side of the diaphragm to the intake manifold of the vehicle engine. In the latter, superatmospheric pressure supplied by a pressure pump to one side of the diaphragm moves it in a direction against atmospheric pressure action on the other side.

In both of these prior cases, the force that a booster unit is capable of delivering is a function of the pressure differential between atmospheric pressure and either manifold vacuum or the pressure developed by a pressure pump and the area of the diaphragm. To produce a booster unit of the prior type having a high output capacity, it is necessary to use a diaphragm having a large diameter or to employ a booster having multiple diaphragms. Increasing the diameter of the diaphragm may be impossible in view of the available space, and both expedients increase the cost of the unit materially. Furthermore, multiple diaphragm boosters are relatively complex in nature.

An important object of the present invention, therefore, is to provide an improved relatively small, compact and inexpensive power brake booster unit assembly having a high output capability.

Further objects of the present invention are to provide a booster unit assembly of the above character which, overall, is relatively inexpensive to manufacture, simple and durable in construction and reliable and efficient in use.

Other objects and advantages of the present invention will become more apparent from the following detailed description taken in conjunction with the drawings in which:

FIGURE 1 is a view illustrating in elevation a typical automotive vehicle engine and showing diagrammatically a typical installation of a power brake booster unit assembly constructed according to the present invention;

FIG. 2 is a sectional view of FIG. 3 taken along the line 2—2 thereof and illustrating the booster unit; and FIG. 3 is a sectional view of FIG. 2 taken along the line 3—3 thereof.

Broadly described, the present invention includes a booster unit having a pressure responsive movable wall therein having one side exposed to a subatmospheric pressure, normally open bypass means subjecting both sides of said wall to said subatmospheric pressure, normally closed valve means adapted, when opened, to connect the other side of said wall to a superatmospheric pressure, actuating means operatively associated with said pressure responsive wall and adapted when moved in one direction to close said bypass means and open said valve means.

Referring now more specifically to the drawings, a power brake booster unit, illustrated generally at 11 in FIG. 1, is seen to include a housing 13 connected by a pair of conduits 15, 17 to a source of vacuum or subatmospheric pressure, such as the intake manifold 19 of an automotive internal combustion engine 21 and to a source of superatmospheric pressure, such as an air injector pump 23, respectively. This pump 23 is conveniently connected to a conventional air filter 24 and may be used, as is the case in a number of modern automotive engines, to supply air to further oxidize and dilute the gases discharged to the engine exhaust manifold and reduce air pollution. Conveniently, the pump 23 is driven by a belt 25 which connects a pair of pulleys 27, 29 mounted on the engine drive shaft 31 and the pump 23, respectively.

The booster unit 11 is shown in greater detail in FIGS. 2 and 3 and as seen there, the housing 13 includes a pair of interconnected housing sections 33, 35 having a pressure responsive wall 37 movably disposed therein. The vacuum conduit 15 is connected to the housing section 33 by a fitting 39 extending through an opening 41 and sealed by a resilient member 43. The pressure conduit 17 extends through an opening 45 in the housing section 35 and is connected by a coupling 47 to one end of a flexible conduit loop or pigtail 49, the other end of which is fitted on a tubular projection 51 secured to or integral with a piston body 53 which forms a part of the pressure responsive wall 37. An annular bead 54 on the conduit 17 overlies and seals the opening 45 and is welded to the housing section 35.

The piston body 53 has an annular seat 55 on which an inner bead 57 of a rolling diaphragm 59 is positioned and held by a radial flange 60 and the projection 51. The diaphragm 59 forms a part of the wall 37 and has an outer bead 61 clamped between the two housing sections 33, 35 and together with the piston body 53 divides the housing 13 into a constant pressure chamber 63 and a variable pressure chamber 65.

The piston body 53 is connected by screws 67 to a plate 69 from which depends a force transmitting rod 71. The outer end of the rod 71 is seated within a plunger 73 slidably disposed in a bore 75 of a master cylinder unit 77. A reservoir 79 supplies hydraulic fluid to the bore 75 through a passage 81 and the plunger 73 is provided with the usual seals 83, 85 to generate hydraulic pressure and actuate the vehicle wheel cylinders (not shown) in the usual manner when the plunger 73 is moved toward the left as seen in FIG. 3. A snap ring 87 prevents the plunger 73 from pulling out of the bore 75.

When the parts are at rest as shown in FIG. 3, a vacuum or subtamospheric pressure condition exists in both of the chambers 63, 65 and the pressure responsive means 37 is biased toward the right in an off position under the force of a bellows spring 89 where a resilient annular seal 88 on the piston body 53 engages an annular flange 90 on the housing section 35. The bellows spring 89 has an outer beaded end 91 clamped between a flange 92 on the housing section 33 and a radial flange 94 on the master cylinder unit 77 and its inner end 93 is seated against the plate 69. The interior of the bellows 89 is exposed to atmospheric pressure through a passage 95 in the master cylinder unit 77 and since the chamber 63 is under a vacuum or subatmospheric pressure condition, the bellows 89 tends to expand and biases the pressure responsive means 37 to the right. A ring 97 surrounds the bellows 89 limiting its expansion and a filter 99 prevents dirt, grease and other foreign matter from getting through the passage 95 and into the bore 75.

A normally open bypass 101 communicates the chambers 63, 65 so that the pressure responsive means 37 normally is vacuum suspended and is held in the position illustrated by the bellows spring 89 as described above. Forming the bypass 101 is a generally cylindrical bore 103 in the piston body 53 communicated with the chamber 65 by a radial passage 105 and normally open to the chamber 63. A seal 107 having a thickened inner end 109 is positioned in a counterbore 111 adjacent the bore 103 with the thickened end 109 normally engaging a tapered lip 113 between the bore 103 and the counterbore 111. The outer end of the seal 107 is also thickened as at 115 and is held in an enlarged bore 117 adjacent the counterbore 111 by a retaining ring 119. A light compression spring 121 between the thickened ends 109, 115 holds the end 109 normally in engagement with the tapered lip 113. In addition, the thickened ends 109, 115 each has an annular rigidifying member 123, 125, respectively, embedded therein to lend rigidity thereto.

An axially slidable piston 127 is loosely disposed within the bore 103 and is connected at its outer end by a resilient washer 129 to a push rod 131 which in turn is operatively connected to a conventional brake pedal (not shown) in the usual manner. The piston 127 has a reduced portion 133 freely extending through the seal 107 and the rigidifying member 123 and is provided with an annular groove 135 adjacent the radial passage 105. An axially projecting lip 137 on the piston 127 adjacent the reduced portion 133 is adapted to engage the thickened end 109 of the seal 107 but is normally held spaced therefrom by a compression spring 139 caged between a radially outwardly extending shoulder 141 on the outer end of the piston 127 and a radial shoulder 143 separating a reduced bore portion 145 and a counterbore 147 in the piston body 53. A snap ring 149 is positioned in the counterbore 147 behind the piston 127 to prevent it from pulling out of the piston body 53 and the piston 127 carries an annular seal 151 which engages the wall of the reduced bore 145 to prevent loss of pressure therepast. Thus, with the parts in their normal positions as shown in FIG. 3, the bypass 101 is open and the vacuum supplied to the chamber 63 through the conduit 15 is communicated to the chamber 65 between the parts which include the seal 107 and the reduced piston portion 133, the seal end 109 and the piston lip 137, the piston 127 and the bore 103, and from around the piston groove 135 out through the radial passage 105. The pressure supplied from the pump 23 to the conduit 17 and thence to the pigtail 49 and the tubular projection 51 is prevented from reaching the chamber 65 by a valve means 153 formed between the thickened end 109 of the seal 107 and the tapered lip 113 which the end 109 normally engages. With the parts in this position, both chambers 63, 65 are under a vacuum or subatmospheric pressure and remain so positioned until the brake pedal (not shown) is applied.

When the pedal (not shown) is applied, the push rod 131 moves toward the left as seen in FIG. 3 as does the piston 127. After a slight movement in this direction, the piston lip 137 engages the thickened seal end 109 and closes the bypass 101 thereby blocking communication between the chambers 63, 65 whereby only the chamber 63 continues to be exposed to the vacuum from the conduit 15. Substantially simultaneously with closing of the bypass 101, the valve 153 opens since movement of the push rod 131 and the piston 127 to the left after the piston lip 137 engages the seal end 109 unseats it from the tapered lip 113. At this point, superatmospheric pressure from the pump 23 flows through the radial passage 105 in the piston body 53 and into the chamber 65. The pressure differential now existing between the chambers 63, 65 acts on the effective area of the pressure responsive wall 37 and causes it to move toward the left under a motivating force substantially greater than that generated by the vehicle operator on the push rod 131. Movement of the pressure responsive wall 37 to the left moves the plunger 73 to pressurize the brake cylinders (not shown) and apply the brakes as described above with step-up force ratio which is a function of the pressure differential between the constant pressure vacuum chamber 63 and the variable, now superatmospheric, pressure chamber 65.

In order to provide pedal reaction or "feel" when the brakes are applied, a lever 155 is positioned adjacent the plate 69 and is pivotally mounted by diametrically spaced trunnions (not shown) for movement about a horizontal axis near the bottom of the plate 69. The lower end of the lever 155 is provided with a pair of rearward projections 157 (only one of which is shown) which engage a radially inwardly extending flange 159 formed on a plate 161 secured to the diaphragm 59 and over which the diaphragm rolls during movement of the pressure responsive means 37. The piston 127 has a resilient bumper 165 positioned in a recess 167 in the piston inner end and the bumper 165 is provided with an axial projection 169 engaging another rearward projection 170 on the lever 155. When the piston 127 moves toward the left as seen in FIG. 3 to close the bypass 101 and open the valve 153 as described above, the diaphragm 59 and the plate 161 move toward the left under the pressure differential in the chambers 63, 65 at a greater rate than that of the piston body 53. The flange 159 on the plate 161 engages and pivots the lever 155 in a clockwise direction causing it to act rearwardly or to the right on the piston 127 through the bumper 165. This, in turn, provides the pedal reaction or "feel" by acting back through the push rod 131 to the brake pedal (not shown) with a force proportional to the differential pressure in the chambers 63, 65. A counteraction compression spring 171 caged between the lever 155 and the rigidifying member 125 normally biases the lever 155 to the off position shown in FIG. 3 but is easily overcome by the tilting force on the lever 155 provided by the flange 159, the compression on one side of the spring being greater than on the other side. A resilient bumper 173 positioned in a recess 175 in the piston body 53 engages the flange 159 and maintains it spaced from the piston body 53.

When the brake pedal is released, the spring 139 returns the piston 127 to the illustrated position relative to the piston body 53. This causes the valve 153 to close and the bypass 101 to open thereby blocking the flow of pressure from the pump 23 to the chamber 65 and permitting communication between the chambers 63, 65 so that the pressures therein rapidly equalize. When this occurs, the bellows spring 89 returns the pressure responsive unit 37 to the illustrated position during which time the spring 139 maintains the illustrated relative positioning of the piston 127 and piston body 53 and the brakes are released.

Should the booster unit 13 fail to operate as described above for any reason, the brakes will still function since when the push rod 131 and piston 127 move toward the left, the bumper 165 and the piston 127 move the lever 155 in a reverse pivotal direction from that described above or counterclockwise as viewed in FIG. 3. This causes the pressure responsive means 37 to move toward the left as well as the plunger 73 to apply the brakes so that even with failure of the power unit, a direct mechanical actuation of the brakes is achieved.

In practice, a pump 23 capable of delivering a pressure of about 10 p.s.i. gage, which is about the pressure delivered by the conventional air injector pumps described above, has been found to operate very effectively. In this example, an average manifold vacuum of about 20 inches of mercury is realized in the chamber 63 and the same power output to the master cylinder 77 was achieved with a booster unit generally smaller than booster units utilizing only subatmospheric or superatmospheric pressure together with atmospheric pressure. This reduces the unit cost greatly and makes it considerably more compact which results in easier placement and repair of the unit 13. The pump 23 is a conventional item on a number of present-day cars and is easily placed atop the engine 21 where it does not interfere with any of the other engine parts.

By the present invention, there has been provided a highly improved, more compact and less expensive power brake booster unit and while a preferred embodiment of the present invention has been illustrated and described above in detail, various additions, substitutions, modifications and omissions may be made thereto without departing from the spirit of the invention as encompassed by the appended claims.

What is claimed is:

1. A fluid pressure operated servo motor for use in a braking system of a motor vehicle, said servo motor comprising housing means, a movable wall supported within said housing means and dividing said housing means into first and second fluid chambers, means for continuously exposing said first fluid chamber to a subatmospheric pressure for tending to move said wall in a first direction to decrease the volume of said first chamber and to increase the volume of said second chamber, bypass passage means interconnecting said first chamber with said second chamber, normally opened bypass valve means for controlling the flow through said bypass passage means, means for moving said wall to a normal position when said bypass valve means is opened and when said first chamber and said second chamber are both exposed to subatmospheric pressure, actuating passage means adapted to be connected to a source of superatmospheric pressure and extending into said second fluid chamber, normally closed actuating valve means for controlling the fluid communication between said actuating passage means and said second fluid chamber, and operating means for simultaneously opening said actuating valve means and for closing said bypass control valve means for exposing said second chamber to superatmospheric pressure while said first chamber remains exposed to subatmospheric pressure for moving said wall from its normal position.

2. The combination as recited in claim 1 wherein said pressure responsive movable wall is operatively connected to a pressure developing master cylinder adapted to pressurize vehicle brake cylinders whereby movement of said actuating means in one direction develops pressure in said master cylinder.

3. The combination recited in claim 1 wherein said pressure responsive movable wall includes a piston body movable within said housing means and said operating means includes a piston slidable within said piston body and wherein said bypass passage means and bypass valve means are formed between said piston and piston body.

4. The combination as recited in claim 3 wherein said movable wall comprises a resilient diaphragm fixed at its outer end to said housing and seated at its inner end on said piston body.

5. The combination as recited in claim 1 wherein said actuating passage means includes a flexible conduit received in said second fluid chamber, one end of said flexible conduit being adapted to be exposed to said source of subatmospheric pressure, the other end of said flexible conduit being affixed to said movable wall for movement with said movable wall.

6. The combination as recited in claim 1 wherein the means for moving said wall to its normal position comprises a flexible bellows received in said first fluid chamber and bearing against said wall and means for exposing the interior of said bellows to a source of atmospheric pressure.

7. A fluid pressure operated servo motor as recited in claim 1 in combination with a motor vehicle having an internal combustion engine, and a system for supplying air to the exhaust system of said engine for further oxidation and dilution of the exhaust gases, said air supplying system including an air compressor driven by said engine, said actuating passage means being connected to said air compressor.

References Cited

UNITED STATES PATENTS

| 2,345,213 | 3/1944 | O'Shei | 60—60 |
| 2,373,272 | 4/1945 | Stelzer | 60—10.5 XR |
| 2,766,852 | 10/1956 | Ingres | 60—54.6 XR |
| 3,002,499 | 10/1961 | Schultz | 60—54.6 XR |
| 3,094,844 | 6/1963 | Helvern | 60—54.6 |
| 3,237,525 | 3/1966 | Stelzer | 60—54.6 XR |

MARTIN P. SCHWADRON, *Primary Examiner.*

ROBERT R. BUNEVICH, *Examiner.*